US006610384B2

(12) United States Patent
Takada et al.

(10) Patent No.: US 6,610,384 B2
(45) Date of Patent: Aug. 26, 2003

(54) LAMINATED FILM FOR THERMOSENSITIVE IMAGE TRANSFER MATERIAL

(75) Inventors: Yasushi Takada, Otsu (JP); Yuri Kubota, Otsu (JP); Takashi Mimura, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 10/278,513

(22) Filed: Oct. 23, 2002

(65) Prior Publication Data

US 2003/0099852 A1 May 29, 2003

(30) Foreign Application Priority Data

Oct. 30, 2001 (JP) ....................................... 2001-332882

(51) Int. Cl.[7] ............................ B32B 3/00; B32B 3/10; B32B 27/06; B32B 27/08; B32B 27/36

(52) U.S. Cl. ........................ 428/152; 428/141; 428/195; 428/480; 428/484; 428/910

(58) Field of Search ................................ 428/141, 152, 428/195, 480, 484, 910; 427/372.2, 384, 385.5, 393.5, 416; 264/288.4, 289.3

(56) References Cited

U.S. PATENT DOCUMENTS 5,407,724 A 4/1995 Mimura et al.

FOREIGN PATENT DOCUMENTS

| | | |
|---|---|---|
| JP | 55007467 | 1/1980 |
| JP | 56155794 | 12/1981 |
| JP | 59148697 | 8/1984 |
| JP | 05-008568 | * 1/1993 |
| JP | 05-077374 | * 3/1993 |
| JP | 6192630 | 7/1994 |

* cited by examiner

*Primary Examiner*—Vivian Chen
(74) *Attorney, Agent, or Firm*—Piper Rudnick LLP

(57) ABSTRACT

A laminated film for thermosensitive image transfer material, comprises a biaxially oriented polyester film including at least one surface thereof a laminated layer containing 50% by weight or more of a wax-based compound, wherein the laminated layer has island-like protrusions, wherein the island-like protrusions have stripe-like protrusions on their surfaces, and wherein a density of the island-like protrusions is 2 to 100 protrusions/100 $\mu m^2$. Such laminated film for thermosensitive image transfer material has excellent hot sticking resistance even in a high energy-applied range, slidability, and printability that cannot be achieved conventionally.

10 Claims, 6 Drawing Sheets

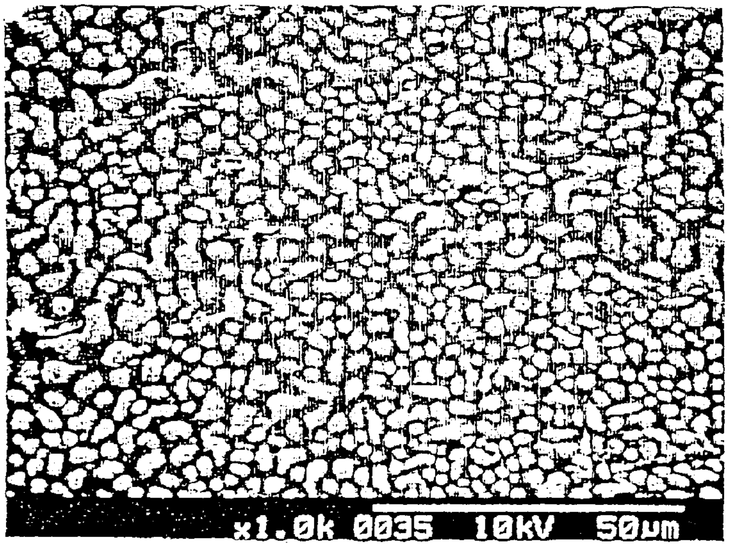
FIG. 1 X1000 magnification
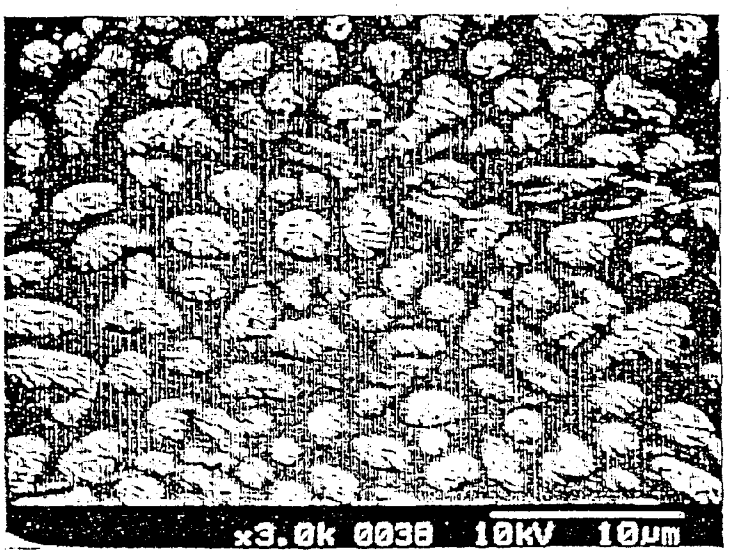
FIG. 2 X3000 magnification

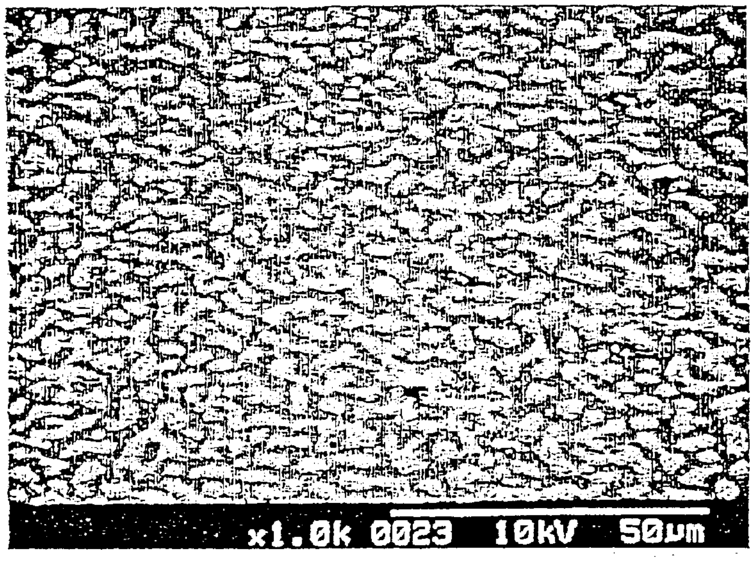
FIG. 3 X1000 magnification
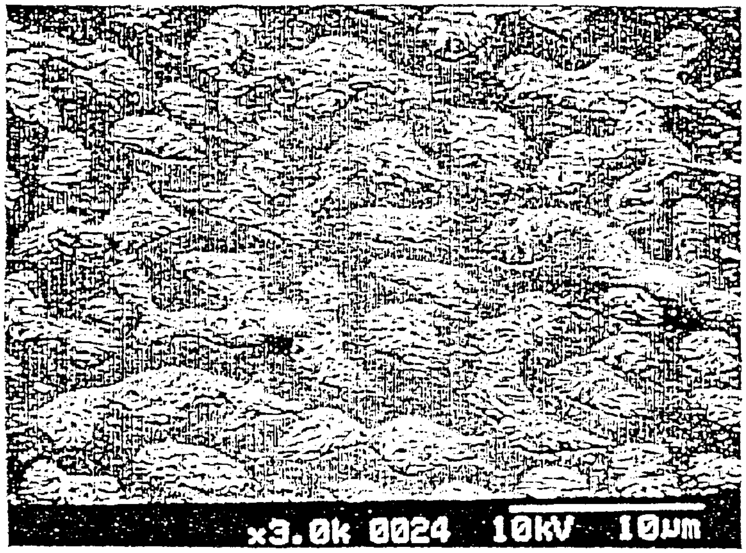
FIG. 4 X3000 magnification

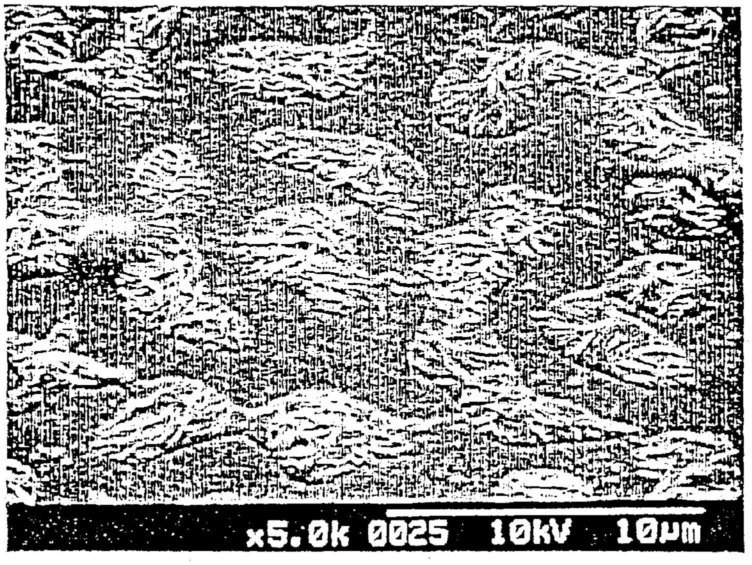
FIG. 5 X5000 magnification
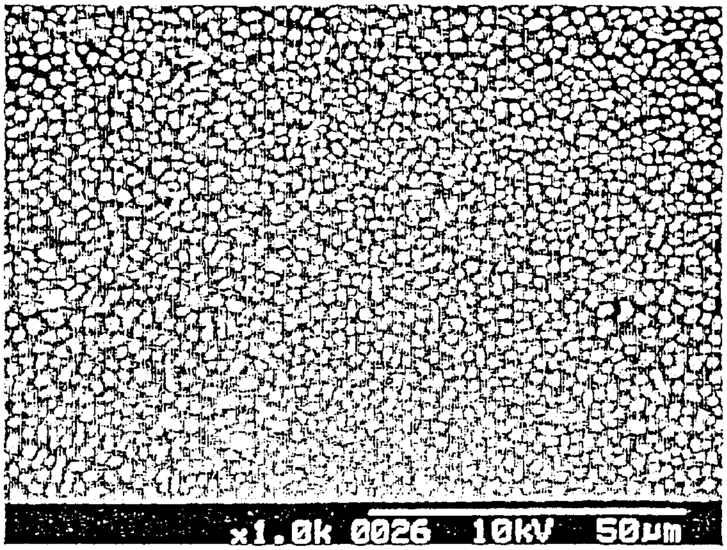
FIG. 6 Example 1, X1000 magnification

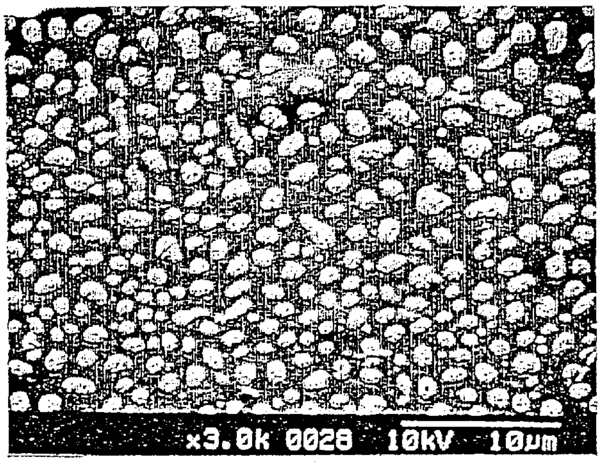
FIG. 7 Example 1, X3000 magnification
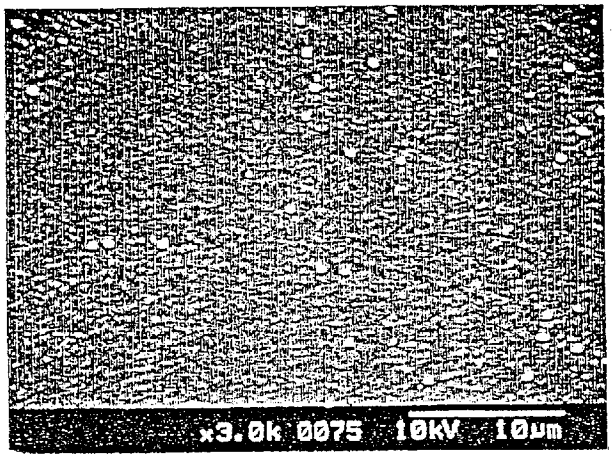
FIG. 8 Comparative Example 2, X3000 magnification

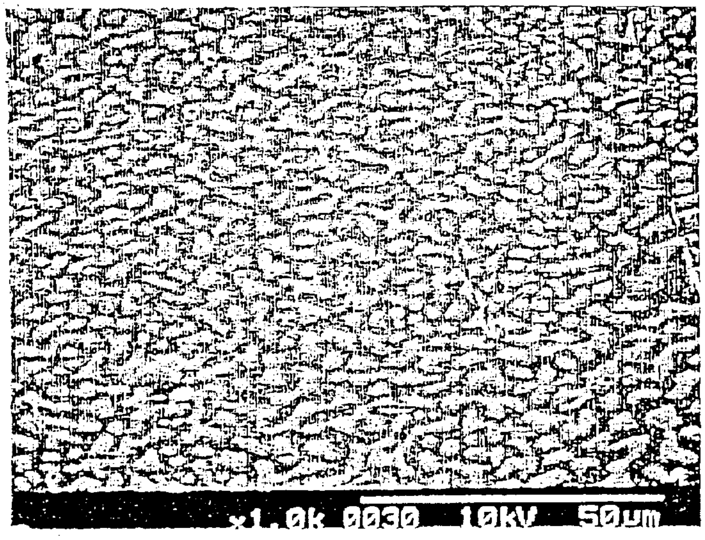
FIG. 9 Example 4, X1000 magnification
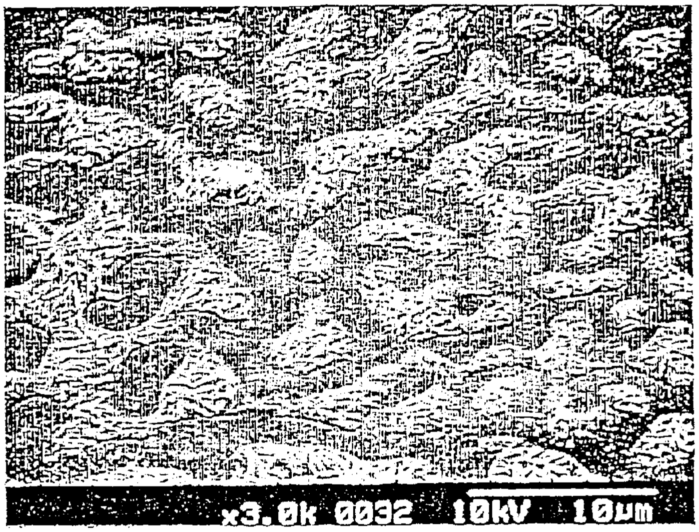
FIG. 10 Example 4, X3000 magnification

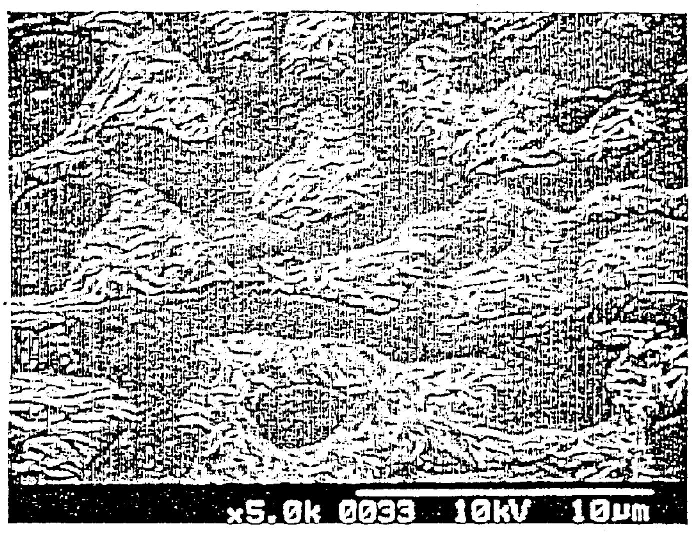
FIG. 11 Example 4, X5000 magnification

LAMINATED FILM FOR THERMOSENSITIVE IMAGE TRANSFER MATERIAL

BACKGROUND OF THE INVENTION

1. Field of the Invention

The present invention relates to a laminated film for thermosensitive image transfer material. More particularly, the present invention relates to a laminated film for thermosensitive image transfer material having excellent hot sticking resistance even in a high energy-applied range, slidability; and printability.

2. Description of the Related Art

Thermosensitive image transfer materials including an ink layer that is melted or sublimated by applying a heat have been widely used for applications such as printing with word processors, bar codes, and facsimiles. In recent years, it becomes possible to form an image with high precision like a silver halide photographic materials, using such thermosensitive image transfer materials including the ink layer that is melted or sublimated by applying a heat.

The thermosensitive image transfer material typically comprises a polyester film as a base film. If the thermosensitive image transfer material comprising a bare polyester film is used for printing, the film is unfavorably fused and stuck to a thermal head by a heat of the thermal head. This is called "hot sticking phenomenon". If the hot sticking phenomenon occurs, the thermosensitive image transfer material does not run smoothly, and the thermal head is contaminated, resulting in insufficient sharpness of a print. In order to overcome the hot stick phenomenon, a heat-resisting protective layer is disposed at a surface of the polyester film where the thermal head is contacted, i.e., the surface being opposite to a thermal image transfer ink layer of the polyester film. A material of the heat-resisting protective layer includes a silicone-based composition,sa fluorine-containing composition, a wax-based composition, and various thermosetting compositions.

Current printer technologies direct to a full color high precision, and high-speed printing. Corresponding to the tendencies, high energy is applied to the printer. For example, Japanese Unexamined Patent Application Publication No. 55-7467 describes a silicone-based, melamine-based, or phenol-based heat-resisting protective layer. The thermosensitive image transfer material including such conventional heat-resisting protective layer has insufficient slidability to the thermal head heated, whereby the hot stick phenomenon occurs. Japanese Unexamined Patent Application Publication No. 56-155794 describes a heat-resisting protective layer including an inorganic pigment. The thermosensitive image transfer material including such conventional heat-resisting protective layer can shorten a life of the thermal head by an abrasion with the thermal head, and may have a roughened surface to decrease thermal conductivity. No sharp print may be provided. Japanese Unexamined Patent Application Publication No. 60-192630 describes a heat-resisting protective layer containing a fluorine-contained resin. The thermosensitive image transfer material including such conventional heat-resisting protective layer has insufficient slidability to the thermal head heated, whereby the hot stick phenomenon occurs. Japanese Unexamined Patent Application Publication Nos. 59-148697 and 60-56583 each describe a heat-resisting, protective layer to which a wax component is applied. The thermosensitive image transfer material including such conventional heat-resisting protective layer is fused by a heat of the thermal head to provide adequate slidability. However, the thermosensitive image transfer material cannot provide satisfactory printability using a current high-speed printer, or at a high energy applied range.

U.S. Pat. No. 5,407,724 is a patent about a laminated film for image transfer material including a layer containing a wax-based composition as a main component, and specific protrusions. However, the laminated film for thermosensitive image transfer material cannot provide satisfactory printability using a current high-speed printer, or at a high energy applied range.

SUMMARY OF THE INVENTION

The present invention provides a laminated film for thermosensitive image transfer material, comprising a laminated layer containing 50% by weight or more of a wax-based compound, wherein the laminated layer has island-like protrusions, wherein the island-like protrusions have stripe-like protrusions on their surfaces, and wherein a density of the island-like protrusions is 2 to 100 protrusions/100 $m^2$.

BRIEF DESCRIPTION OF THE DRAWINGS

FIG. 1 is a photomicrograph at ×1000 magnification obtained by a scanning electron microscope of a typical laminated layer according to the present invention.

FIG. 2 is a photomicrograph at ×3000 magnification obtained by a scanning electron microscope of the same laminated layer of FIG. 1.

FIG. 3 is a photomicrograph at ×1000 magnification obtained by a scanning electron microscope of other laminated layer having a different surface from that of the layer in FIGS. 1 and 2.

FIG. 4 is a photomicrograph at ×3000 magnification obtained by a scanning electron microscope of the same laminated layer of FIG. 3.

FIG. 5 is a photomicrograph at ×5000 magnification obtained by a scanning electron microscope of the same laminated layer of FIG. 3.

FIG. 6 is a photomicrograph at ×1000 magnification obtained by a scanning electron microscope of a laminated layer according to Example 1.

FIG. 7 is a photomicrograph at ×3000 magnification obtained by a scanning electron microscope of the same laminated layer of FIG. 6.

FIG. 8 is a photomicrograph at ×1000 magnification obtained by a scanning electron microscope of a laminated layer according to Comparative Example 2.

FIG. 9 is a photomicrograph at ×1000 magnification obtained by a scanning electron microscope of a laminated layer according to Example 4.

FIG. 10 is a photomicrograph at ×3000 magnification obtained by a scanning electron microscope of the same laminated layer of FIG. 9.

FIG. 11 is a photomicrograph at ×5000 magnification obtained by a scanning electron microscope of the same laminated layer of FIG. 9.

DESCRIPTION OF THE PREFERRED EMBODIMENTS

The laminated film for thermosensitive image transfer material of the present invention comprises a laminated layer containing 50% by weight or more of a wax-based compound, wherein the laminated layer has island-like protrusions, wherein the island-like protrusions have stripe-like protrusions on their surfaces, and wherein a density of the island-like protrusions is 2 to 100 protrusions/100 $\mu m^2$.

The surface morphologies of the laminated film for thermosensitive image transfer material of the present invention having island-like protrusions, and stripe-like protrusions on their surfaces will be described.

In the present invention, shapes of the protrusions are determined by a photomicrograph of a scanning electron microscope (hereinafter referred to as "SEM"). In practice, a round-protrusion herein includes any round shape protrusions observed by the photomicrograph of the SEM, such as a spherical protrusion and a cylindrical protrusion. Accordingly, in the present invention, when the protrusion is herein defined as round or stripe, the protrusion is not only two-dimensional, but also is three-dimensional, i.e., has a height.

FIGS. 1 to 5 show photomicrographs obtained by the SEM of typical laminated layers of the laminated film for thermosensitive image transfer material according to the present invention, although the laminated film according to the present invention is not limited thereto.

FIG. 1 is a photomicrograph at ×1000 magnification of the SEM. In FIG. 1, it can be observed that a large number of approximate round island-like protrusions and deformed island-like protrusions where two or more island-like protrusions may be connected. In each Figure, a straight, line at lower right-hand represents a scale. For example, in FIG. 1, a length of the straight line corresponds to 50 $\mu$m.

FIG. 2 is a photomicrograph at ×3000 magnification obtained by the SEM of the same laminated layer of FIG. 1. It can be observed that a large number of finer stripe-like protrusions are formed on the surfaces of the island-like protrusions.

FIG. 3 is one example of a laminated layer having a different-surface from that of the layer in FIGS. 1 and 2. FIG. 3 is a photomicrograph at ×1000 magnification obtained by the SEM. Although-the approximate round island-like protrusions exist, a large number of island-like protrusions, which some of protrusions are connected, are formed.

FIG. 4 is a photomicrograph at ×3000 magnification obtained by the SEM of the same laminated layer of FIG. 3. It can be observed that a large number of finer stripe-like protrusions are formed on the surfaces of the island-like protrusions.

FIG. 5 is a photomicrograph at ×5000 magnification obtained by the SEM of the same laminated layer of FIG. 3. It is clearly observed that the island-like protrusions and the stripe-like protrusions on the island-like protrusions are formed on the surface of the polyester film.

As described above, in the present invention, the morphologies of the island-like protrusions may be round shapes, or approximate round shapes, or may be connected to form round or approximate round shapes, but are not limited thereto.

In the laminated film for thermosensitive image transfer material of the present invention, the density of the island-like protrusions should be 2 to 100 protrusions/1.00 $\mu m^2$, preferably 3 to 60 protrusions/100 $\mu m^2$, more preferably 5 to 50 protrusions/100 $\mu m^2$. When the density of the island-like protrusions is 2 to 100 protrusions/100 $\mu m^2$, excellent hot sticking resistance is provided. Thus, the effectiveness of the present invention is fully provided. The island-like protrusions may have various types of shapes such as round shapes and approximate round shapes, or may be connected to form round or approximate round shapes. The density of the island-like protrusions is obtained by counting isolated island-like protrusions.

In the laminated film for thermosensitive image transfer material of the present invention, the island-like protrusions occupy preferably 20 to 80%, more preferably 40 to 80% of the surface of the laminated layer. If the island-like protrusions occupy 0% of the surface of the laminated layer, no island-like protrusions are formed and there are no protrusions. If the island-like protrusions occupy 100% of the surface of the laminated layer, the whole surface of the laminated layer of polyester film is overlapped with the island-like protrusions.

The stripe-like protrusions are formed on the surfaces of the island-like protrusions. Their shapes are not especially limited, as long as the protrusions have stripe-like shapes as shown in the above-mentioned Figures. For example, the stripe-like protrusions may be linear, circular, curved, or a combination thereof. The size of the stripe-like protrusion-is determined by a ratio R of a length in a longitudinal direction and a length in a transverse direction thereof, i.e., a width direction. The ratio R is represented by the following formula:

Ratio $R$=(length in a longitudinal direction)/(length in a width direction)

As to one stripe-like protrusion, the ratio R is preferably 3 or more, more preferably 4 or more, and most preferably 5 or more in view of excellent slidability.

The longer the stripe-protrusion is, the greater the effectiveness, i.e., the slidability is. The ratio R is generally 50 at the maximum, as shown in FIG. 5.

The above-mentioned stripe-like protrusions may be formed separately, or in a mesh pattern. The density of the stripe-like protrusions is not especially limited as long as the advantages of the present invention are not inhibited. The density of the stripe-like protrusions is preferably 10 to 10000 protrusions/100 $\mu$m , more preferably 50 to 1000 protrusions/100 $\mu m^2$. If the protrusions are formed independently, the protrusions are counted per unit area. If the protrusions are formed in the mesh pattern, the protrusions are counted as one protrusion from one branch point to the other branch point. The length of the stripe-like protrusion is not especially limited, but is preferably 0.1 to 5 $\mu$m, more preferably 0.2 to 2 $\mu$m.

The laminated film for thermosensitive image transfer material of the present invention comprises a laminated layer containing 50% by weight or more, preferably 70% by weight or more, more preferably 80% by weight or more of a wax-based compound.

The laminated film for thermosensitive image transfer material of the present invention comprises a laminated layer containing preferably 70% by weight or more, more preferably 80% by weight or more of a mixture of a wax-based compound and an oily substance.

Preferably, the laminated film for thermosensitive image transfer material of the present invention comprises a laminated layer containing the mixture of the wax-based compound and the oily substance. The wax-based compound can be mixed with the oily substance at an optional ratio. In order to clearly provide the advantages of the present invention, the solid weight ratio of the wax-based compound to the oily substance in the laminated layer is preferably 99/1 to 60/40, more preferably 97/3 to 70/30, most preferably 95/5 to 80/20 for providing excellent hot sticking resistance. If less than 1% by weight of the oily substance is added, the effectiveness is decreased, and the hot sticking resistance is also decreased. If more than 40% by weight of the oily substance is added, the laminated layer tends to be sticky at room temperature, i.e., 23° C.

The laminated layer according to the present invention is produced by the non-limiting methods. Preferably, the laminated layer of the present invention is produced by an in-line coating method in which a coating solution for forming the laminated layer is coated in the production processes of a polyester film. Preferable coating solution for forming the lamination layer is an aqueous coating solution of a wax-based compound having a specific particle size, and a specific melting point. The coating solution may be a mixture of an aqueous coating solution of the wax-based compound and an aqueous coating solution of an oily substance.

The wax-based compound for use in the laminated layer according to the present invention is described, for example, in "Properties of wax, and its application", Kenzo Fusegawa, ed., published by Saiwai shobo (1983).

Any solid or semi-solid organic compositions at room temperature can be used as the wax-based compound for use in the present invention. The non-limiting examples of the wax-based compound include natural wax, synthetic wax, or mixed wax.

The natural wax is classified into vegetable wax, animal wax, mineral wax, petroleum wax, and the like. The synthetic wax is classified into a synthetic hydrocarbon such as polyethylene wax, modified wax, hydrogenated wax, fatty acid, acid amide, ester, ketone, and the like. The mixed wax is obtained by mixing the above-mentioned wax with a synthetic resin, or the like.

Specific examples of the vegetable wax include candelilla wax, carnauba wax, rice wax, haze tallow, jojoba oil, palm wax, auricurie wax, sugar cane wax, esparto wax, bark wax, and the like. Specific examples of the animal wax include bees wax, lanolin, spermaceti wax, insect wax, shellac wax, coccus cacti wax, water bird wax, and the like. Specific examples of the mineral wax include montan wax, ozokerite, ceresin, and the like. Specific examples of the petroleum wax include paraffin wax, microcrystalline wax, petrolatum, and the like.

The wax-based compound for use in the present invention is not especially limited within the above-described range. Preferred are the synthetic wax, the mineral wax, and the petroleum wax, with the slidability and printability taken into consideration. Especially preferred is the synthetic wax such as polyethylene wax, with the slidability, printability, and availability taken into consideration.

In the present invention, the wax-based compound can be used as a coating solution in the form of, for example, water dispersion or emulsion. In view of the formation of the island-like protrusions, a particle size of the compound in the water dispersion or the emulsion is preferably 0.01 to 1 $\mu$m, more preferably 0.03 to 0.5 $\mu$m, most preferably 0.05 to 0.2 $\mu$m. For example, in the in-line coating method, if the particle size is too large, the wax-based compound may be fused by a heat treatment in film forming steps to significantly stick to the adjacent island-like protrusions, whereby the island-like protrusions may be formed insufficiently. On the other hand, if the particle size is too small, the slidability may become poor, and the coating solution may have poor stability and it may not be used practically.

The melting point of the wax-based compound is preferably 90 to 200° C., more preferably 100 to 150° C., most preferably 100 to 140° C. for forming the island-like protrusions easily. If the melting point is too low, in the in-line coating method, the wax-based compound is easily melted in preheating and drying steps, and stretching in the film forming steps, and the island-protrusions are not easily formed. Also, in an off-line coating method, if the melting point is too low, the island-like protrusions are not easily formed, depending on a drying temperature after coating.

The laminated film for thermosensitive image transfer of the present invention is preferably produced by coating a coating solution for forming the laminated layer to the polyester film, stretching and heat-treating the film, before crystal orientation is not yet completed. When the laminated layer is formed using the aforementioned method, the wax-based compound is preferably water-based by dissolving, emulsifying or suspending in water, with environmental pollution or explosion-proof taking into consideration.

The wax-based compound can be dissolved, emulsified or suspended by a solubilization (phase inversion) method, a mechanical method, an oxidation emulsification method, or the like.

The aqueous coating solution of polyethylene wax suitable for use in the present invention can be produced by the following methods:

In the solubilization (phase inversion) method, a surfactant such as polyethylene wax, sorbitan monostearate, and polyoxyethylene stearyl ether; and water are introduced into a vessel, heated and agitated to adsorb the surfactant to the surface of the polyethylene wax, whereby a polyethylene wax emulsion can be produced using the water as a medium.

In the mechanical method, a dispersant such as polyethylene wax, stearic acid, and triethanolamine; and water are introduced into a vessel, heated, and agitated using a homo mixer. After a uniform mixture is obtained, homogenizer is used to produce polyethylene wax emulsion.

The polyethylene wax is oxidized, to which a carboxyl group or a hydroxyl group is added. The surfactant is added thereto, whereby polyethylene wax emulsion can be produced. In this case, since the carboxyl group or the hydroxyl group is introduced into the polyethylene wax as a functional group, adhesion of the lamination layer to the base film is improved.

In the laminated film for thermosensitive image transfer material of the present invention, when the mixture of the wax-based compound and the oily substance is preferably used, there can be provided excellent printing at the high pulse width range, and good running upon printing at the high energy range.

The oily substance for use in the laminated film for thermosensitive image transfer material of the present invention is liquid or paste oil at room temperature. The non-limiting example of the oily substance include vegetable oil, fat and oil, mineral oil, and synthetic lubricating oil. Specific examples of the vegetable oil include linseed oil, kaya oil, safflower oil, soybean oil, china wood oil, sesame oil, corn oil, rapeseed oil, eucalyptus oil, cotton seed oil, olive oil, sasanqua oil, tsubaki oil, castor oil, peanut oil, palm oil, and coconut oil. Specific examples of the fat and oil include beef tallow, hog fat, mutton tallow, and cacao butter. Specific examples of the mineral oil include machine oil, insulating oil, turbine oil, motor oil, gear oil, cutting oil, and liquid paraffin. As the synthetic lubricating oil, those having the characteristics written in Encyclopaedia Chimica published by Kyoritsu Publishing Co., i.e., those having higher viscosity indices, lower flow points, better heat stabilities and oxidation-stabilities, and less likely to ignite than petroleum lubricating oils may be optionally used. Specific examples of the synthetic lubricating oil include olefin polymer oils such as ethylene polymer oil, and butylene polymer oil; diester oils such as bis(2-ethylhexyl) sebacate, bis(1-ethylpropyl) sebacate, and bis(2-ethylhexyl) adipate; polyalkylene glycol oils obtained by addition polymerization or addition copolymerization of an alkylene oxide such as ethylene oxide and aliphatic monohydric alcohol; silicone oils and the like. Among these, the mineral oil and the synthetic lubricating oil which exhibit good running in the high pulse range are preferred. Especially preferred is the synthetic lubricating oil. A mixture of the mineral oil and the synthetic lubricating oil may be used.

The polyester of the biaxially oriented polyester film in the laminated film for thermosensitive image transfer material of the present invention is not especially limited, but preferably polyethylene terephthalate, polyethylene naphthalate, polypropylene terephthalate, polybutylene terephthalate, polypropylene naphthalate, and the like. They may be used in combination.

These polyesters may be copolymerized with other dicarboxylic acids or diols. In this case, the film after the crystal orientation is completed has preferably crystallinity of 25% or more, more preferably 30% or more, most preferably 35% or more. If the crystallinity is less than 25%, dimensional stability or mechanical strength may be insufficient.

The laminated film for thermosensitive image transfer material of the present invention may be a multi-layered film comprising two or more layers, i.e., an inside layer and a surface layer. The inside layer may contain substantially no particles, and the surface layer may contain particles. Or, the inside layer may contain bulk particles, and the surface layer may contain fine particles. In such multi-layered film, the inside layer and the surface layer may be formed of different polymers or the same polymer.

When the polyester film is used as the laminated film for thermosensitive image transfer material of the present invention, intrinsic viscosity of the polyester measured in o-chlorophenol at 25° C. is preferably 0.4 to 1.2 dl/g, more preferably 0.5 to 0.8 dl/g.

The laminated film for thermosensitive image transfer material of the present invention is biaxially oriented after the laminated layer is formed. The term "biaxially oriented" herein means that the non-stretched polyester film before the crystal orientation is not completed is stretched in a longitudinal direction and a width direction, and then the crystal orientation is completed by heat treatment, and that it exhibits biaxially oriented pattern determined by wide angle X-ray diffraction. If the polyester film is not biaxially oriented, the resulting laminated film has poor dimensional stability,,especially at high humidity and high temperature, insufficient mechanical strength, and poor planarity.

The laminated layer of the laminated film for thermosensitive image transfer material of the present invention may contain various types of additives, resin compositions, and cross linking agents as long as the advantages of the present invention are not inhibited. Examples of the various types of additives, resin compositions, and cross linking agents include antioxidants, heat resisting stabilizers, ultraviolet ray absorbing agents, organic particles, pigments, dyes, antistatic agents, nucleus formation agents, acrylic resins, polyester resins, urethane resins, polyolefin resins, polycarbonate resins, alkyd resins, epoxy resins, urea resins, phenol resins, silicone resins, rubber resins, melamine cross linking agents, oxazoline cross linking agents, methylol and/or alkylol urea cross linking agents, acryl amide, polyamide, isocyanate compounds, aziridine compounds, various silane coupling agents, various titanate coupling agents, and the like.

It is more preferable that inorganic particles be added to the polyester film, since the slidability is further improved by synergistic effect of the island-like protrusions of the laminated layer. Examples of the inorganic particles include silica, colloidal silica, alumina, alumina sol, kaolin, talc, mica, calcium carbonate, barium sulfate, carbon black, zeolite, titanium oxide, metal fine particles, and the like. The inorganic particle has preferably an average particle size of 0.005 to 3 $\mu$m, more preferably 0.05 to 1 $\mu$m. The inorganic particles are added preferably in the amount of 0.01 to 5% by weight, more preferably 0.1 to 2% by weight.

Since the thermal head may be damaged by the inorganic particles in the laminated layer, it is preferable that the laminated layer contains no inorganic particles. As long as the inorganic particles has the size and the amount such that the thermal head is not abraded and damaged when the thermosensitive image transfer material comprising the laminated layer in which the inorganic particles are added is used, it is possible to add the inorganic particles to the laminated layer.

The non-limiting preferred method for producing the laminated film for thermosensitive image transfer material of the present invention will be described below.

In the present invention, the in-line coating method is preferable. In the in-line coating method, for example, polyester pellets and extruding, and it's crystal orientation is not completed, is stretched in a longitudinal direction about 2.5 to 5 times longer, and the uniaxial stretched film is continuously coated with a coating solution. The coated film is passed through heated zones to be dried, and stretched in a width direction about 2.5 to 5 times longer. In addition, the film is continuously introduced into heated zones at 150 to 250° C. to complete the crystal orientation. In general, the film is stretched in the longitudinal direction, coated, and then stretched in the width direction. However, the film may be stretched in the width direction, coated, and then stretched in the longitudinal direction, or the film may be coated, and then stretched in longitudinal and width directions at the same time.

In a preferred embodiment of the present invention, the surface of the base film, i.e., the uniaxial stretched film as described above, may be corona discharge treated so that wetting tension of the base film is preferably 47 mN/m or more, more preferably 50 mN/m or more. Thus, the adhesion between the laminated layer and the base film, and the coatability can be improved. It is also preferable that a minor amount of an organic solvent such as isopropyl alcohol, butyl cellosolve, N-methyl-2-pyrollydone, and the like be added to the coating solution to improve the wettability, and the adhesion to the base film.

The laminated film for thermosensitive image transfer material of the present invention has preferably a thickness of 1 to 10 $\mu$m, more preferably 2 to 7 $\mu$m. The laminated layer has preferably a thickness of 0.001 to 2 $\mu$m, more preferably 0.01 to 1 $\mu$m. If the laminated film is too thick, the heat may be poorly transferred from the thermal head to decrease printability. On the other hand, if the laminated layer is too thin, the hot sticking resistance may be poor.

The laminated layer can be coated to the base film by various coating methods including a reverse coating method, a gravure coating method, a rod coating method, a bar coating method, a meyer bar coating method, a die coating method, a spray coating method, and the like.

The non-limiting method for producing the laminated film for thermosensitive image transfer material of the present invention will be described below using polyethylene terephthalate (hereinafter referred to as "PET") as the base film.

PET pellets having intrinsic viscosity of 0.5 to 0.8 dl/g are vacuum dried, fed into an extruder, fused at 260 to 300° C., and extruded through a T-die into a sheet. The sheet is wound around a casting drum having a mirror finished surface at a surface temperature of 10 to 60° C. using a electrostatic casting method, and cooled and solidified to form non-stretched PET film. The non-stretched film is stretched in a longitudinal direction (a feeding direction of the film) 2.5 to 5 times longer between rolls heated to 70 to 120° C. The corona discharge treatment is applied to at least one surface of the film, whereby the wetting tension of the surface is 47 mN/m or more. The aqueous coating solution according to the present invention is coated to the treated surface. The coated film is grasped with a clip to introduce into a hot air zone heated to 70 to 130° C., dried, stretched in the width direction 2.5 to 5 times longer, introduced into a heat treatment zone at 180 to 250° C., and heat-treated for 1 to 30 seconds to complete the crystal orientation. In the heat treatment, the film may be relaxed 1 to 10% in the width direction or the longitudinal direction, as required. The biaxial stretching may be longitudinal, transverse sequential stretching, or cocurrent biaxial stretching. After the film is stretched in the longitudinal and transverse directions, the film may be restretched either in the longitudinal direction or in the transverse direction. The thickness of the polyester film is not especially limited, but is preferably 1 to 10 $\mu$m.

When the base film on which the laminated layer is disposed contains at least one substance selected from a composition for forming the laminated layer and a reaction product thereof, the adhesion between the laminated layer and the base film can be improved, and the slidability of the laminated polyester film can be enhanced. The composition for forming the laminated layer or the reaction product thereof is preferably added in the total amount of 5 ppm or more to less than 20% by weight, from the viewpoint of good adhesion and slidability. The use of recycled pellets containing the composition for forming the lamination layer is suitable, with environmental protection and productivity taking into consideration.

When the thus-obtained laminated film is used as the thermosensitive image transfer material, it has excellent hot sticking resistance even in a high energy-applied range, as well as good slidability, and printability.

Also, when the thus-obtained laminated film is, used as the base film for the thermosensitive image transfer material such as a thermal fused type thermosensitive image transfer material (TTR; thermal transfer ribbon) and a sublimation type image transfer material (DDTT; dye diffusion type thermal transfer ribbon), it has excellent hot sticking resistance even in a high, energy-applied range, slidability, and printability. Therefore, the laminated film according to the present invention can be suitably used as the thermosensitive image transfer material within a wide energy-applied range.

The properties of the laminated film of the present invention were measured and evaluated as follows:

(1) Thickness of Laminated Layer

The laminated film was cut in a cross-section direction into a piece. The piece was observed by a transmission electron microscope to measure a thickness of the laminated layer. The thickness including the protrusions was determined by averaging thicknesses in some points of the piece.

(2) Protrusion Density

The surface of the laminated film was observed using a scanning electron microscope "S-2100A" manufactured by Hitachi, Ltd. to determine shapes of the island-like protrusions and the stripe-like protrusions, and the density of the island-like protrusions. The density (protrusions/100 $\mu m^2$) of the island-like protrusions was measured five times for different locations within 10 $\mu$m x 10 $\mu$m area, and averaged to round off.

(3) Island-like Protrusion Occupation

The island-like protrusion occupation was determined as follows: the areas other than the island-like protrusions in the image obtained in the above (2) were marked with a black color. Using an image processing apparatus, white parts (island-like protrusions) and black part (areas other than the island-like protrusions) were recognized to calculate the island-like protrusion occupation.

(4) Hot Sticking Resistance (Evaluated as the Thermosensitive Image Transfer Material)

The thermosensitive image transfer material was produced by coating a thermal fused type ink having the composition below to the surface opposite to the surface on which the laminated layer was formed (in the case of both surfaces laminated, either surface may be coated) in the thickness of 3.5 μm using a hot melt method. The composition of the thermal fused type ink:

| | Parts by weight (pbw) |
|---|---|
| Carnauba wax | 100 pbw |
| Microcrystalline wax | 30 pbw |
| Vinyl acetate/ethylene copolymer | 15 pbw |
| Carbon black | 20 pbw |

Printing was made using the thermosensitive image transfer material with a thermosensitive image transfer printer "BC-8MKII" manufactured by Autonics:KK under the conditions that a thermal head had head resistance of 500 Ω, an applied voltage was changed, and a pulse width was 2.8 miliseconds. A critical applied voltage where no sticking occurred was recorded. The higher the applied voltage is, the more the thermosensitive image transfer material withstands the high energy applied. If the critical applied voltage is 6 V or more, the thermosensitive image transfer material can be used practically. If the critical applied voltage is 10 V or more, the thermosensitive image transfer material has excellent hot sticking resistance. The presence or absence of the hot sticking phenomenon was determined by running properties of the thermosensitive image transfer material, and a sound of a hot sticking upon printing.

(5) Printability

In the above (3), printing was conducted using the thermosensitive image transfer material at an applied voltage of 8 V, a pulse width of 0.5 miliseconds. The printing results were observed visually, and evaluated by the following scales:

VG: Very good printing

G: Good printing

P: Poor printing with some edge lacking, partly bad printing

VP: Very poor printing with no printing parts (6) Slidability

The laminated film of the present invention was evaluated for the slidability using a surface tester "HEIDON-14DR" manufactured by Shinto Kagaku; KK at 23° C. under 65% relative humidity (hereinafter referred to as "RH") in accordance with a handling instruction of a frictional resistance test (ASTM plane indenter). Refer to ASTM D-1894. The laminated film was set to a stage side so that the laminated surface was top, and a non-processed film for a ribbon (6 μm) "LUMIRROR F53" manufactured by Toray Industries, Inc. was set to the plane indenter side. The conditions were as follows:

Plane indenter: measured area was 63.5 mm×63.5 mm

Sample: width of 100 mm, length of 180 mm

Load: 1.96 N (a weight was 200 g)

Speed : 150 mm/min

The slidability under heat was measured as follows:

A heating apparatus for heating a measurement stage was set to the surface tester "HEIDON-14DR" manufactured by Shinto Kagaku Co., Ltd. The laminated film of the present invention was heated at 120° C. for 20 seconds. After that, the slidability was measured under the same conditions as described above. The laminated film was set to a stage side so that the laminated surface was top, the surface opposite to the surfaces on which the laminated layer was disposed was heated, and the non-processed film for the ribbon (6 μm) "LUMIRROR F53" manufactured by Toray Industries, Inc. was set to the plane indenter side.

The slidability under heat was compared with the slidability at 23° C. under 65%RH, and evaluated as the following scales:

VG: Very good; the slidability under heat was similar to that at 23° C. under 65%RH (having coefficient of dynamic friction less than 1.1 times), or was better than that at 23° C. under 65%RH.

G: Good; the slidability under heat was a little lower than that at 23° C. under 65%RH (having coefficient of dynamic friction less than 1.5 times).

B: Bad; the slidability under heat was lower than that at 23° C. under 65%RH (having coefficient of dynamic friction less than 2 times).

VB: Very bad; the slidability under heat was significantly lower than that at 23° C. under 65%RH (having coefficient of dynamic friction more then 2 times).

(7) Melting Point

Using a differential scanning calorimeter "DSC (RDC220)" and a data analyzer, disk station "SSC/5200" both manufactured by Seiko Instruments Inc., about 10 mg of a sample was set to an aluminum pan, and heated at a temperature rising rate of 20° C./min from a room temperature. A melting endothermic peak temperature was recorded as a melting point.

EXAMPLES

The following examples are provided to illustrate presently contemplated preferred embodiments, but are not intended to be limiting thereof.

Example 1

PET pellets having intrinsic viscosity of 0.63 dl/g and containing 0.25% weight of silica particles with an average particle size of 1.4 μm were vacuum dried at 180° C., fed into an extruder, fused at 285° C., and extruded through a T-die into a sheet. The sheet was wound around a casting drum having a mirror finished surface at a surface temperature of 25° C. using a electrostatic casting method, and cooled and solidified to form non-stretched PET film. The non-stretched film was stretched in a longitudinal direction 3.5 times longer between rolls heated to 90° C. to provide a uniaxial stretched film. The corona discharge treatment was applied to a coated surface of the uniaxial stretched film, whereby the wetting tension of the surface was 56 mN/m or more. The coating solution for forming a laminated layer prepared as described below was coated to the treated surface so that a wet coated thickness of 9 μm. The coated film was grasped with a clip at both ends to introduce into a preheated zone heated to 100° C., preheated for 3 seconds, dried, stretched in the width direction 3.5 times longer at a heating zone at 110° C., introduced into a heat treatment zone at 225° C., and heat-treated for 6 seconds to complete the crystal orientation of the laminated film. The laminated film having a thickness of 6 $\mu$m was thus produced.

On the surface of the laminated layer in the laminated film, island-like protrusions having a density of 35 protrusions/100 $\mu m^2$, and stripe-like protrusions were formed as shown in FIGS. 6 and 7.

The laminated film was evaluated as the thermosensitive image transfer material. As a result, no hot sticking phenomenon occurred even in the high energy applied range, and excellent printability and slidability were obtained.

<Coating Solution for Forming Laminated Layer>

Water dispersion with a particle diameter of 0.1 $\mu$m of polyethylene wax having a melting point of 120° C. was prepared as Wax No. 1. The Wax No. 1 was diluted with water to have a solid concentration of 1.5% by weight.

Comparative Example 1

The procedure for preparation of the laminated film Example 1 was repeated except that a coating solution for forming the laminated film was changed to have a composition described below.

When the surface of the laminated film was observed, no island-like protrusions nor stripe-like protrusions were formed. However, gently-sloping protrusions of the PET film itself were formed. These gently-sloping protrusions were derived from the silica particles added in the extrusion step.

The thus-obtained laminated film had very excellent slidability, since the coating layer comprising silicone-based resin that forms a low-energy surface was formed on the surface. However, as a result of evaluating the laminated film as the thermosensitive image transfer material, the printability in the high energy-applied range was insufficient. When a thermal fused type ink was coated on a surface opposite to the surface on which the laminated layer was formed, repellent was produced which may be induced by transfer of silicone oligomer. The laminated film was not suitable for the thermosensitive image transfer material.

<Coating Solution for Forming Laminated Layer>

A aqueous coating solution of silicone graft acrylic, which was water-based emulsion comprising acrylic resin having polydimethyl silicone at side chains, was diluted with water so that a solid concentration of 3% by weight.

Comparative Example 2

The procedure for preparation of the laminated film Example 1 was repeated except that a coating solution for forming the laminated film was changed to have a composition described below.

The surface of the laminated film was observed. As a result, island-like protrusions having approximately circle shapes, and a density of 3 protusions/100 $\mu m^2$ were produced by silica particles added to the coating solution, but no stripe-like protrusions were formed as shown in FIG. 8.

The laminated film was evaluated as the thermosensitive image transfer material. As a result, the laminated film was not run in the printer even in low energy-applied range, and hot sticking phenomenon occurred to break the laminated film.

<Coating Solution for Forming Laminated Layer>

Polyester resin: Water dispersion of copolymer polyester resin having a glass transition temperature of 60° C. comprising terephthalic acid (88 mol %), 5-sodium sulfoisophtalate (120 mol %), ethylene glycol (80 mol %), and diethylene glycol (20 mol %).

Silica particles: Water dispersion of colloidal silica particles having a particle size of 0.3 $\mu$m.

The polyester resin and the silica particles were mixed at a solid weight ratio of 99.5/0.5. The mixture was diluted with water so that a solid concentration was 2% by weight.

Example 2

The procedure for preparation of the laminated film Example 1 was repeated except that a coating solution for forming the laminated film was changed to have a composition described below.

On the surface of the laminated layer in the laminated film, island-like protrusions having a density of 50 protrusions/100 $\mu m^2$, and stripe-like protrusions were formed.

The laminated film was evaluated as the thermosensitive image transfer material. As a result, no hot sticking phenomenon occurred even in the high energy applied range, excellent printability were obtained, and the thermal head was not contaminated.

<Coating Solution for Forming Laminated Layer>

Wax 2: Water dispersion of polyethylene wax having a melting point of 120° C., the dispersion having a particle size of 0.08 $\mu$m.

Oily substance: Water dispersion of synthetic lubricating oil comprising polyethylene glycol oil The Wax 2 and the oily substance were mixed at a solid weight ratio of 80/20. The mixture was diluted with water so that a solid concentration was 1.5% by weight.

Example 3

The procedure for preparation of the laminated film Example 1 was repeated except that a coating solution for forming the laminated film was changed to have a composition described below.

On the surface of the laminated layer in the laminated film, island-like protrusions having a density of 10 protrusions/100 $\mu m^2$, and stripe-like protrusions were formed.

The laminated film was evaluated as the thermosensitive image transfer material. As a result, no hot sticking phenomenon occurred even in the high energy applied range, excellent printability were obtained, and the thermal head was not contaminated.

<Coating Solution for Forming Laminated Layer>

Wax 3: Water dispersion of polyethylene wax having a melting point of 110° C., the dispersion having a particle size of 0.08 $\mu$m.

Oily substance: Water dispersion of synthetic lubricating oil comprising polyethylene glycol oil Leveling agent: Water solution of a polyoxyethylene nonyl phenol ether type nonionic surfactant The Wax 3, the oily substance and the leveling agent were mixed at a solid weight ratio of 80/20/3. The mixture was diluted with water so that a solid concentration was 1.5% by weight.

Example 4

The procedure for preparation of the laminated film Example 1 was repeated except that a coating solution for forming the laminated film was changed to have a composition described below.

On the surface of the laminated layer in the laminated film, island-like protrusions having a density of 7 protrusions/100 $\mu m^2$, and stripe-like protrusions were formed as shown in FIGS. 9, 10 and 11.

The laminated film was evaluated as the thermosensitive image transfer material. As a result, no hot sticking phenomenon occurred even in the high energy applied range, excellent printability were obtained, and the thermal head was not contaminated.

<Coating Solution for Forming Laminated Layer>

Wax 4: Water dispersion of polyethylene wax having a melting point and a softening point of 100° C., the dispersion having a particle size of 0.2 $\mu$m.

Oily substance: Water dispersion of synthetic lubricating oil comprising polyethylene glycol oil The Wax 4 and the oily substance were mixed at a solid weight ratio of 85/15. The mixture was diluted with water so that a solid concentration was 2% by weight.

Example 5

The procedure for preparation of the laminated film Example 1 was repeated except that a coating solution for forming the laminated film was changed to have a composition described below.

On the surface of the laminated layer in the laminated film, island-like protrusions having a density of 20 protrusions/100 $\mu m^2$, and stripe-like protrusions were formed.

The laminated film was evaluated as the thermosensitive image transfer material. As a result, no hot sticking phenomenon occurred even in the high energy applied range, excellent printability were obtained, and the thermal head was not contaminated.

<Coating Solution for Forming Laminated Layer>

Wax 5: Water dispersion of polyethylene wax having a melting point of 135° C., the dispersion having a particle size of 0.08 $\mu$m.

Leveling agent: Water solution of a fluoro-based nonionic surfactant "Plus coat" RY-2 manufactured by Goo Chemical CO., Ltd.

The Wax 5 and the leveling agent were mixed at a solid weight ratio of 100/2. The mixture was diluted with water so that a solid concentration was 0.65% by weight.

Example 6

The procedure for preparation of the laminated film Example 1 was repeated except that a coating solution for forming the laminated film was changed to have a composition described below.

On the surface of the laminated layer in the laminated film, island-like protrusions having a density of 40 protrusions/100 $\mu m^2$, and stripe-like protrusions were formed.

The laminated film was evaluated as the thermosensitive image transfer material. As a result, no hot sticking phenomenon occurred even in the high energy applied range, excellent printability were obtained, and the thermal head was not contaminated.

<Coating Solution for Forming Laminated Layer>

Wax 5: Water dispersion of polyethylene wax having a melting point of 135° C., the dispersion having a particle size of 0.08 $\mu$m.

Oily substance: Water dispersion of synthetic lubricating oil comprising polyethylene glycol oil Leveling agent: Water solution of a fluoro-based nonionic surfactant "Plus coat" RY-2 manufactured by Goo Chemical CO., Ltd.

The Wax 5, the oily substance and the leveling agent were mixed at a solid weight ratio of 80/20/2. The mixture was diluted with water so that a solid concentration was 0.65% by weight.

The results are shown in Table 1 below. In Table 1, Tm means a melting point of wax.

TABLE 1

| | Composition of coating solution for forming laminated layer (solid weight ratio) | Properties of Wax | | Hot sticking resistance (V) | Printability | Slidability | Surface morphology | | | |
|---|---|---|---|---|---|---|---|---|---|---|
| | | Tm (° C.) | Particle size ($\mu$m) | | | | Island-like protrusions | Density of island-like protrusions (protrusions/100 $\mu m^2$) | Stripe-like protrusions | Occupation (%) |
| Ex.1 | Wax 1 | 120 | 0.1 | 6 | G | G | Presence | 35 | Presence | 30 |
| Comp. Ex.1 | Silicon graft acrylic | — | — | 4 | B | G | Absence | 0 | Absence | 0 |
| Comp. Ex.2 | Polyester/Silica particles (99.5/0.5) | — | — | 3 or less | VB | B | Presence | 3 | Absence | 2 |
| Ex.2 | Wax 2/Synthetic lubricating oil (80/20) | 120 | 0.08 | 12 | VG | VG | Presence | 50 | Presence | 40 |
| Ex.3 | Wax 3/Synthetic lubricating oil/Surfactant (80/20/3) | 110 | 0.08 | 13 | VG | VG | Presence | 10 | Presence | 50 |
| Ex.4 | Wax 4/Synthetic lubricating oil (85/15) | 100 | 0.2 | 10 | G | G | Presence | 7 | Presence | 50 |
| Ex.5 | Wax 5/Surfactant (100/2) | 135 | 0.08 | 9 | G | VG | Presence | 20 | Presence | 40 |

TABLE 1-continued

| | Composition of coating solution for forming laminated layer (solid weight ratio) | Properties of Wax | | Hot sticking resistance (V) | Print-ability | Slidability | Surface morphology | | | |
|---|---|---|---|---|---|---|---|---|---|---|
| | | Tm (° C.) | Particle size ($\mu$m) | | | | Island-like protrusions | Density of island-like protrusions (protrusions/100 $\mu m^2$) | Stripe-like protrusions | Occupa-tion (%) |
| Ex.6 | Wax 5/Synthetic lubricating oil/Surfactant (80/20/2) | 135 | 0.08 | 13 | VG | VG | Presence | 40 | Presence | 40 |

What is claimed is:

1. A laminated film for thermosensitive image transfer material, comprising a biaxially oriented polyester film including at least one surface thereof a laminated layer containing 50% by weight or more of a wax-based compound, wherein the lamination layer has island-like protrusions, wherein the island-like protrusions have stripe-like protrusions on their surfaces, and wherein a density of the island-like protrusions is 2 to 100 protrusions/100 $\mu m^2$.

2. A laminated film for thermosensitive image transfer material according to claim 1, wherein the laminated layer contains 70% by weight or more of the wax-based compound.

3. A laminated film for thermosensitive image transfer material according to claim 1, wherein the density of the island-like protrusions is 3 to 60 protrusions/100 $\mu m^2$.

4. A laminated film for thermosensitive image transfer material according to claim 1, wherein the island-like protrusions occupy 20 to 80% of the surface of the laminated layer.

5. A laminated film for thermosensitive image transfer material according to claim 1, wherein a density of the stripe-like protrusions is 10 to 10000 protrusions/100 $m^2$.

6. A laminated film for thermosensitive image transfer material according to claim 1, wherein the wax-based compound in the laminated layer has a melting point of 90 to 200° C.

7. A laminated film for thermosensitive image transfer material according to claim 1, wherein the wax-based compound has a melting point of 100 to 150° C.

8. A laminated film for thermosensitive image transfer material according to claim 1, wherein the laminated layer contains the wax-based compound, and an oily substance, and wherein a solid weight ratio of the wax-based compound to the oily substance is 99/1 to 60/40.

9. A laminated film for thermosensitive image transfer material according to claim 8, wherein the oily substance is a synthetic lubricating oil or a mineral oil.

10. A laminated film for thermosensitive image transfer material according to claim 1, obtainable by coating a coating solution containing 50% by weight or more of the wax-based compound on at least one surface of the polyester film, and drying, stretching, and then heat-treating the film.

* * * * *

UNITED STATES PATENT AND TRADEMARK OFFICE

CERTIFICATE OF CORRECTION

PATENT NO. : 6,610,384 B2
DATED : August 26, 2003
INVENTOR(S) : Yasushi Takada et al.

It is certified that error appears in the above-identified patent and that said Letters Patent is hereby corrected as shown below:

Column 4,
Line 8, please change "1.00" to -- 100 --;
Line 58, please change "100 $\mu m$" to read -- 100 $\mu m^2$ --.

Column 17,
Line 3, please change "100 $m^2$" to read -- 100 $\mu m^2$ --.

Signed and Sealed this

Twenty-second Day of June, 2004

JON W. DUDAS
*Acting Director of the United States Patent and Trademark Office*